(12) United States Patent
Howson et al.

(10) Patent No.: US 10,186,070 B2
(45) Date of Patent: Jan. 22, 2019

(54) ON DEMAND GEOMETRY AND ACCELERATION STRUCTURE CREATION

(71) Applicant: Imagination Technologies Limited, Kings Langley (GB)

(72) Inventors: John W. Howson, Kings Langley (GB); Luke T. Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 223 days.

(21) Appl. No.: 14/440,021

(22) PCT Filed: Nov. 1, 2013

(86) PCT No.: PCT/IB2013/002935
§ 371 (c)(1),
(2) Date: Apr. 30, 2015

(87) PCT Pub. No.: WO2014/068400
PCT Pub. Date: May 8, 2014

(65) Prior Publication Data
US 2015/0317818 A1     Nov. 5, 2015

Related U.S. Application Data

(60) Provisional application No. 61/722,109, filed on Nov. 2, 2012, provisional application No. 61/798,786, filed on
(Continued)

(51) Int. Cl.
*G06T 1/20* (2006.01)
*G06T 15/06* (2011.01)
*G06T 15/00* (2011.01)

(52) U.S. Cl.
CPC .............. *G06T 15/06* (2013.01); *G06T 1/20* (2013.01); *G06T 15/005* (2013.01)

(58) Field of Classification Search
CPC ....... G06T 15/06; G06T 15/005; G06T 15/08; G06T 2200/04
(Continued)

(56) References Cited

U.S. PATENT DOCUMENTS 6,466,226 B1  10/2002  Watson et al.
6,784,884 B1  8/2004  Hsieh
(Continued)

FOREIGN PATENT DOCUMENTS

EP   1 081 646 A2   3/2001
GB   2 442 266 A    4/2008
(Continued)

OTHER PUBLICATIONS

Schwarz et al. "Fast GPU-based Adaptive Tessellation with CUDA", EUROGRAPHICS 2009 vol. 28, No. 2.*
(Continued)

*Primary Examiner* — Kimberly A Williams
(74) *Attorney, Agent, or Firm* — Vorys, Sater, Seymour and Pease LLP; Vincent M DeLuca

(57) ABSTRACT

Systems and methods of geometry processing, for rasterization and ray tracing processes provide for pre-processing of source geometry, such as by tessellating or other procedural modification of source geometry, to produce final geometry on which a rendering will be based. An acceleration structure (or portion thereof) for use during ray tracing is defined based on the final geometry. Only coarse-grained elements of the acceleration structure may be produced or retained, and a fine-grained structure within a particular coarse-grained element may be produced in response to a collection of rays being ready for traversal within the coarse-grained element. Final geometry can be recreated in response to demand from a rasterization engine, and from ray intersection units that require such geometry for intersection testing
(Continued)

with primitives. Geometry at different resolutions can be generated to respond to demands from different rendering components.

20 Claims, 11 Drawing Sheets

Related U.S. Application Data on Mar. 15, 2013, provisional application No. 61/897,701, filed on Oct. 30, 2013.

(58) Field of Classification Search
USPC .................................................. 345/242, 424
See application file for complete search history.

(56) References Cited

U.S. PATENT DOCUMENTS

| | | | |
|---|---|---|---|
| 7,466,316 B1 | 12/2008 | Alben et al. | |
| 7,812,850 B1 | 10/2010 | Nelson | |
| 9,189,883 B1* | 11/2015 | Hecht | G06T 15/08 |
| 9,547,932 B2* | 1/2017 | Karras | G06T 15/06 |
| 2002/0171651 A1 | 11/2002 | Kurihara et al. | |
| 2004/0113909 A1* | 6/2004 | Fenney | G06T 17/20 |
| | | | 345/419 |
| 2005/0195188 A1* | 9/2005 | Goel | G06T 15/005 |
| | | | 345/423 |
| 2006/0256112 A1* | 11/2006 | Heirich | G06T 15/00 |
| | | | 345/427 |
| 2007/0206008 A1 | 9/2007 | Kaufman et al. | |
| 2007/0229521 A1 | 10/2007 | Li et al. | |
| 2007/0252843 A1 | 11/2007 | Yu et al. | |
| 2008/0192044 A1 | 8/2008 | Fowler et al. | |
| 2009/0219285 A1* | 9/2009 | Reshetov | G06T 15/06 |
| | | | 345/420 |
| 2009/0284523 A1 | 11/2009 | Peterson et al. | |
| 2010/0079457 A1* | 4/2010 | Tavenrath | G06T 15/005 |
| | | | 345/426 |
| 2010/0238169 A1* | 9/2010 | Fowler | G06T 15/06 |
| | | | 345/421 |
| 2010/0289799 A1* | 11/2010 | Hanika | G06T 15/06 |
| | | | 345/421 |
| 2011/0221743 A1 | 9/2011 | Keall et al. | |
| 2011/0310102 A1* | 12/2011 | Chang | G06T 17/20 |
| | | | 345/423 |
| 2012/0050289 A1* | 3/2012 | Park | G06T 15/06 |
| | | | 345/426 |
| 2012/0081368 A1* | 4/2012 | Park | G06T 15/005 |
| | | | 345/426 |
| 2012/0169728 A1* | 7/2012 | Mora | G06T 15/06 |
| | | | 345/419 |
| 2012/0249553 A1 | 10/2012 | Peterson et al. | |
| 2013/0033507 A1* | 2/2013 | Garanzha | G06T 15/06 |
| | | | 345/522 |
| 2013/0050213 A1* | 2/2013 | McCombe | G06T 15/06 |
| | | | 345/426 |
| 2013/0207967 A1* | 8/2013 | Park | G06T 15/06 |
| | | | 345/419 |
| 2013/0342528 A1* | 12/2013 | Lee | G06T 15/06 |
| | | | 345/419 |
| 2014/0022264 A1* | 1/2014 | Shreiner | G06T 17/20 |
| | | | 345/520 |
| 2014/0092091 A1* | 4/2014 | Li | G06T 17/20 |
| | | | 345/423 |
| 2014/0267259 A1* | 9/2014 | Frascati | G06T 15/005 |
| | | | 345/423 |
| 2014/0340403 A1* | 11/2014 | Droske | G06T 15/06 |
| | | | 345/426 |
| 2015/0022521 A1* | 1/2015 | Loop | G06T 15/06 |
| | | | 345/424 |
| 2015/0145873 A1* | 5/2015 | Akenine-Moller | G06T 11/40 |
| | | | 345/506 |
| 2016/0239994 A1* | 8/2016 | Chung | G06T 15/06 |
| 2017/0091986 A1* | 3/2017 | Fishwick | G06T 15/405 |
| 2018/0005427 A1* | 1/2018 | Marvie | G06T 15/005 |

FOREIGN PATENT DOCUMENTS

| | | |
|---|---|---|
| GB | 2458488 A | 9/2009 |
| GB | 2480012 A | 11/2011 |
| WO | 20091063319 A2 | 5/2009 |

OTHER PUBLICATIONS

Shebanow, "The Fermi Architecture," NV Research, 2010, pp. 1-36.
Princeton University, "Parallel Rendering," Sep. 28, 1998, pp. 1-7.

* cited by examiner

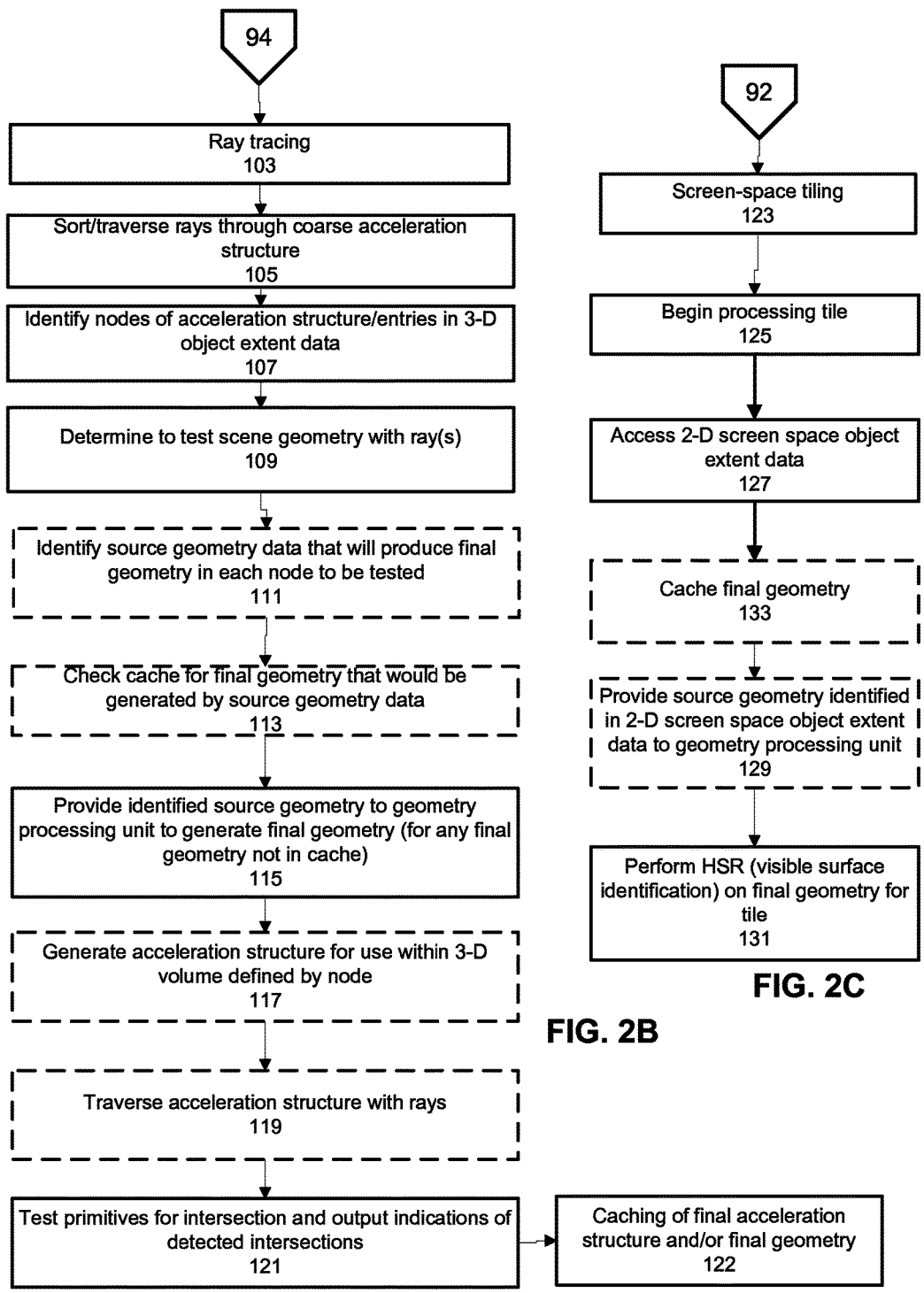

| Coarse acceleration structure element ID | Number of ray groups to traverse | Hints for fine acceleration structure characteristics | Hints for primitives characteristics | Complexity hint(s) |
|---|---|---|---|---|
| Element | | | | |
| Element | | | | |

| Ray/thread ID | Traversal status |
|---|---|
| Ray | |
| Ray | |

ON DEMAND GEOMETRY AND ACCELERATION STRUCTURE CREATION

BACKGROUND

Field

In one aspect, the following relates to rendering systems that use geometry inputs defined in 3-D space.

Related Art

Rendering of images (as an example rendering output) from a 3-D scene description can be accomplished using a variety of approaches. One approach uses rasterization techniques, in which primitives are mapped from 3-D coordinates to a 2-D screen space, in order to determine a visible surface, which can then be textured and shaded. Another approach is to use ray tracing, which involves tracing rays through the 3-D space. Ray tracing can better model effects reflections and refractions, and can generate highly complex and physically accurate images.

Both rasterization and ray tracing use geometry data as an input, to define objects that are located in the 3-D scene. Geometry data define the extent of surfaces in the scene, but not their ultimate coloration, and texture, for example. However, detailed geometry can yield important advances to realistic and enjoyable computer graphics experiences. There can be a tradeoff between detail in an object and an amount of memory required to store the geometry data representing the object.

SUMMARY

One aspect relates to a machine-implemented method for use in 3-D rendering. The method comprises accessing geometry data describing geometry located in a 3-D scene, from which a rendering is to be produced, the data describing geometry control points and procedural modifications that can be performed on the geometry control points to produce final geometry on which the rendering will be based. The method also comprises producing, using the final geometry, geometry extents data that each establish an association between a volume defined in the 3-D scene and a selection of the geometry control points that, after procedural modification, if any, produce final geometry that respectively is within that volume.

Such a method may further comprise defining rays to be traced in the 3-D scene, by identifying a volume in the 3-D space in which a subset of the rays is to be tested for intersection and using the geometry extents data to identify geometry control points that produce final geometry in the identified volume in the 3-D space. Then, the method further comprises executing any procedural modifications for those identified geometry control points to produce final geometry in the identified volume, and then testing final geometry for intersection with the subset of the rays.

The method may further comprise producing an acceleration structure comprising elements bounding respective portions of the 3-D scene, and using the acceleration structure to identify respective subsets of the final geometry to be tested for intersection with different rays. The method may further comprise using hint data to define the volumes in the 3-D scene that are referenced in the geometry extent data. The method may further comprise associating procedural modifications with geometry extents data that are required to produce final geometry within a volume of the 3-D scene to which the geometry extents data pertains.

The method also may further comprise making a rendering using both a rasterization subsystem and a ray tracing subsystem that each make requests for portions of final geometry, and responsive to the requests, producing the final geometry by performing the procedural modifications associated with the geometry extents data associated with volumes of the 3-D scene bounding the requested portions of final geometry.

The method also may further comprise producing final geometry having a level of detail dependent on whether to the request originated from the ray tracing subsystem or the rasterization subsystem.

The method also may further comprise producing both a finalized acceleration structure within a portion of the 3-D scene and final geometry within that portion of the 3-D, responsive to a request from the the ray tracing subsystem.

The method also may further comprise producing a coarse acceleration structure with leaf elements and using leaf elements of the coarse acceleration structure as the geometry extents data.

The method also may further comprise collecting rays to be traced against elements of the coarse acceleration structure and traversing rays collected against a particular element of the coarse acceleration structure by dynamically producing a finalized acceleration structure within that particular element of the coarse acceleration structure prior to scheduling traversal operations for the collected rays.

The method also may further comprise producing final geometry within portions of the finalized acceleration structure responsive to a scheduler indication.

The method also may further comprise performing the accessing and producing in a pre-pass over source geometry data, the source geometry data comprising vertex data and two or more sets of vertex connectivity data.

The procedural modifications that can be performed on the geometry control points may comprise procedural modifications to be used for producing finalized geometry for ray tracing and procedural modifications to be used for producing finalized geometry for rasterization.

Aspects also may provide for the producing of the geometry extents data to comprise producing a hint indicating an amount of geometry expansion to be expected when producing final geometry for the volume defined in the 3-D scene that is associated with that portion of geometry extents data.

Methods may implement the accessing by accessing a hint that is associated with a control point, which indicates a bound on an amount of geometry that may result when performing procedural modification using that control point, to produce final geometry.

Another aspect provides a method of geometry processing for 3-D rendering. The method comprises producing geometric primitives located in a 3-D scene from source geometry data and defining a set of tile object lists. Each tile object tile contains data indicating which source geometry from the set of source geometry results in geometric primitives that are within a boundary of a respective tile of pixels of a 2-D image. The method also comprises producing an acceleration structure comprising a graph of elements, each defining a respective volume in the 3-D scene and rendering the 2-D image from the scene by using the tile object lists to identify a visible surface at each pixel of the 2-D image, and tracing rays in the 3-D scene, using the acceleration structure, from the identified visible surfaces to identify a primitive intersected by each of the rays, if any, and producing information contributing to a final shade for the visible surface at each pixel.

Another aspect provides a method of 3-D geometry processing for graphics rendering. The method comprises defining a respective set of modification processes to be performed on portions of source geometry, in order to produce final geometry located in respective portions of a 3-D scene and producing a respective element of an acceleration structure that bounds each of the portions of the 3-D scene and associating, with the element. The respective set of modification processes are performed in order to produce final within that element. The method also comprises defining a set of tile object lists. Each tile object list identifies source geometry and a respective set of modification processes to be performed on the identified source geometry to produce final geometry within a tile of pixels within a 2-D image to be rendered from the 3-D scene, and rendering the 2-D image by identifying visible surfaces for pixels within the 2-D image on a tile by tile basis. The rendering comprises identifying source geometry from the tile object list for each tile, and performing the set of modification processes on the source geometry to produce final geometry. A visible surface for each pixel in that tile is identified based on the produced final geometry, and to complete the rendering for a group of the pixels, rays are emitted from the visible surface for pixels and traversed in the 3-D scene. The rays are traversed in the 3-D scene.

Another aspect provides a method of 3-D geometry processing for graphics rendering. The method comprises producing final geometry from source geometry by applying one or more geometry modification processes to the source geometry, the production of the final geometry limited to a subset of final geometry located in a 3-D scene from which a 2-D rendering is being made; and controlling caching of particular portions of the produced final geometry, based on demand indicated for the particular portions of the produced final geometry by one or more consumers thereof.

Another aspect provides a method of 3-D geometry processing for graphics rendering, comprising producing final geometry from source geometry by applying one or more geometry modification processes to the source geometry, the producing characterized by a plurality of discrete productions, each producing final geometry limited to a subset of final geometry located in a 3-D scene; and scheduling the plurality of discrete productions of the final geometry by collecting requests for particular sub-sets of final geometry into groups and based on a scheduling criteria, and relatively ordering the plurality of discrete productions according to the scheduling criteria.

A further aspect provides a method of 3-D geometry processing for graphics rendering, comprising producing final geometry from source geometry by applying one or more geometry modification processes to the source geometry, the producing characterized by a plurality of discrete productions, each producing final geometry limited to a subset of final geometry located in a 3-D scene; and scheduling the plurality of discrete productions of the final geometry by collecting requests for particular sub-sets of final geometry into groups and based on a scheduling criteria, and relatively ordering the plurality of discrete productions according to the scheduling criteria.

Any of these aspects may be implemented in a computing system. Such a computing system may comprise programmable elements that can be programmed to implement geometry modification processes, control processes, shading processing, including shading processes for shading visible surfaces determined from rasterization and also shading ray intersections. The computing system may comprise fixed or limited function elements, such as fixed or limited function elements for ray tracing operations, such as traversing rays through an acceleration structure or testing rays for intersection with geometric primitives. Systems implementing aspects of the disclosure may comprise both rasterization and ray tracing subsystems. These different subsystems may be implemented on common hardware, with different software. Other supporting hardware may be provided in such systems, including texturing sampling and blending. Such systems may comprise one or more memories for storing source geometry, and cache(s) for storing finalized geometry. These memories may be part of a memory hierarchy. Such systems may be part of a portable device, such as a tablet or smartphone, a laptop or desktop computer, or embedded, such as embedded within a device, such as a television or appliance.

BRIEF DESCRIPTION OF THE DRAWINGS

FIGS. 2A-C depict aspects of an example process for on-demand geometry in a system that performs both rasterization and ray tracing;

DETAILED DESCRIPTION

Figure 1:
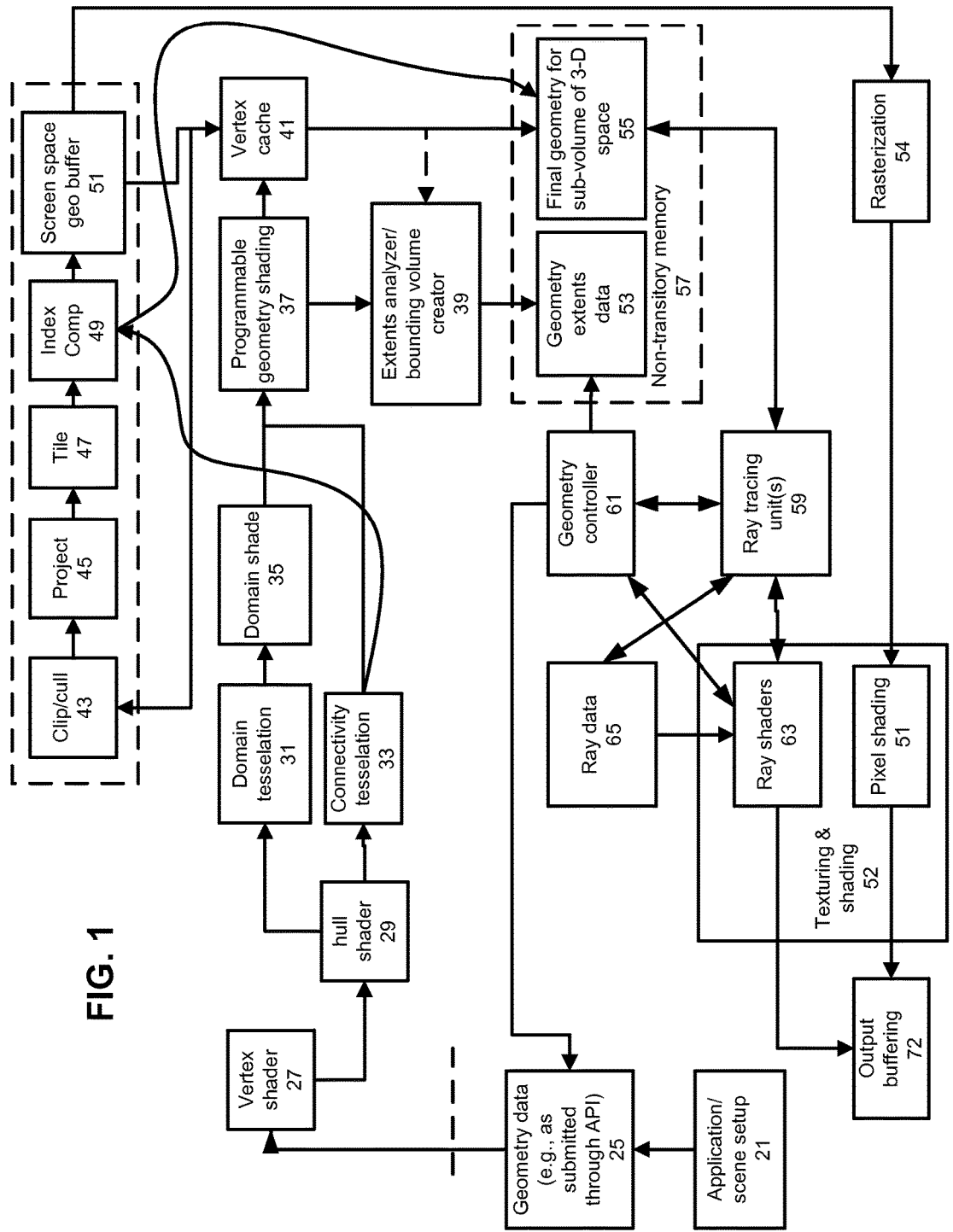
FIG. 1 depicts components of an example system for on demand geometry processing.

Techniques to reduce an amount of memory required to represent a definition of the surface of an object include specifying surfaces of objects as patches that have control points, which can be used to produce vertexes of primitives. Additionally, vertexes of primitives can be used as input to tessellation and to geometry shaders or displacement engines that can amplify a number of primitives by dicing a larger primitive into smaller ones, or otherwise deform geometry so that an extent of geometry after these further geometry operations is different from an original extent.

In an unconstrained memory resource environment, it may be acceptable to simply produce final geometry for an entire 3-D scene, and store it in a fast Random Access Memory. However, in a computing environment in which fast memory resources are constrained, it may be impossible or undesirable to allocate enough memory to store such data.

The following relates to approaches for reducing a memory footprint required to store geometry, in order to render images of a given complexity. Aspects disclosed below relate both to rasterization and ray tracing approaches to rendering. Such approaches also can be adapted to other situations in which complex 3-D geometry may need to be used in a memory constrained environment. Memory constrained does not imply any specific memory constraint, but rather is related to the complexity of geometry sought to be used. As such, a memory constraint is a design consideration in an overall platform. If memory footprint to process geometry of a given complexity can be reduced, then a bill of materials for a device may be reduced by including less memory.

In one aspect, an implementation of the disclosure performs a pre-pass that gathers information, generates information, or both gathers and generates information that defines how a set of input geometry data results in a set of geometry data that is used in scene rendering. For example, in one approach, the source scene geometry can be run through a geometry pipeline, which can include translating patches into a set of primitives, tessellating these primitives into other primitives, performing displacement mapping, and running geometry shaders on this data. This pre-pass can be performed before rendering of the scene begins, or can be performed for the first time that a given scene is used for rendering.

An output of this pre-pass is a description of where the final geometry exists. This description can be varied according to what type or types of rendering is to be performed. For example, in the context of a tile-based rendering system, such information can include a description of which original elements of geometry ultimately produce a primitive or other portion of geometry that is within the bounds of each screen-space tile. In the context of ray tracing, such information can include a set of bounding boxes, or a coarse acceleration structure that identifies bounding volumes that will function as geometry expansion points in 3-D space. There can be an association between each original primitive and each bounding volume that contains a part of final geometry resulting from that original primitive. A variety of more specific examples are provided below.

A wide variety of approaches to specifying 3-D scene geometry are available. For simplicity, the disclosure provides examples of implementations that begin with a surface patch, which can be used to define vertexes, that can be amplified by tessellation or displaced, or operated on by programmable geometry shading are disclosed. Additionally, an approach to on-demand geometry in the context of Tile Based Deferred Rendering (TBDR) is disclosed, in addition to an approach for ray tracing rendering.

First, the plurality of primitives are tessellated primitives generated by tessellating a patch of surface data. However, it will be appreciated that implementations are not limited to this embodiment and may be used equally with tessellated primitives generated by other means or with non-tessellated primitives.

Geometry Processing

FIG. 1 shows a schematic diagram illustrating a graphics pipeline for generating and shading a computer graphics image in a tile-based rendering system that supports both tessellation and ray tracing of tessellated geometry.

Geometry data 25 defines objects in 3-D space for use during rendering. Geometry data 25 may include descriptions of higher order surfaces, such as patches (e.g., Bezier patches), meshes of primitives defined by vertexes and connectivity data, or other ways to specify geometry. Geometry data 25 is supplied to a geometric processing unit 61 which can manipulate geometry data, and can derive primitives from the object data, or otherwise produce a specification of geometry that can be used for the geometry processing to be performed. Geometry data 25 can be in one or more formats as submitted through an Application Programming Interface (API) during a rendering setup process. For example, if both the ray tracing and the rasterization processes to be performed by the rendering system consume triangular primitives, then geometry processing unit 61 can input higher order surface descriptions and output a mesh of triangular primitives.

In an example, geometry data 25 can be submitted (e.g. streamed) for processing. In an example, patches of geometry can be supplied to a vertex shader 27, which can in turn provide shaded vertex data to a hull shader 29. Vertex shader 27 can, for example, programmatically move control points of patches (e.g., a combination of one or more of translation, rotation, or scaling), or perform initial vertex lighting, or both, or other types of programmatic operations on these control points. These control points can be provided to units that perform tessellation-related functions.

Tessellation involves breaking up a low detail model, for example a higher order surface, which can be referred to as a "patch", into a plurality of tessellated primitives. A "patch" is typically a function of a polynomial equation which defines a set of control points which describe the shape of a curve with respect to variable 't' (for a curve in two dimensions) or domain coordinates 'u,v' (for a curve in three dimensions). One example of a patch used in computer graphics is a Bezier patch, but others exist as will be appreciated by a person skilled in the art. At present, flat patches are commonly used, for example triangular patches, which are split into multiple primitives which are then displaced by a function and/or in dependence on a displacement height map to create a plurality of tessellated primitives. Tessellation is an example of an approach to programmatically deriving a plurality of primitives from a description of a surface. A patch is a surface defined by a parametric relationship (e.g., for 3-D, uv coordinates). Points on the surface can be defined using the parametric coordinates. As will be known to those skilled in the art, tessellation of patches of surface data in a graphics pipeline can be supported by a number of application programming interfaces (API's), for example, Microsoft's Direct 3D11 API. Microsoft's Direct 3D11 API supports displacement mapping, whereby the tessellated primitives may be at a displaced location from the surface of the patch.

Programmable vertex shading, as can be applied to patches or to individual primitives, can be used to generate modified primitives according to a functional description. For example, where programmable vertex shading is employed at vertex shading 27, the outputs of that vertex shading can be tessellated. As an example, a plurality of modified primitives or patches can be generated from input geometry, where each of the modified primitives or patches is at a displaced location from a location of source geometry from which it was derived. Each of these modified elements of geometry may be generated incrementally. For example, a first generated primitive may be closest to a position of the original primitive, and each of the subsequently-generated primitives may be progressively farther from the position of the input primitive. Another example is a defocus blur application, where a plurality of modified primitives may be generated at small offsets from an input primitive, without necessarily being at increasing distances from the input primitive. However, in general, modified primitives may be generated in any order or sequence, including an arbitrary order.

Hull shader 29 can calculate tessellation factors for edges of a given patch and may also further modify the transformed control points. Hull shader 29 outputs to domain tessellation 31 and connectivity tessellation 33. Domain tessellation subdivides a patch into a number of known points called "domain" points based on the tessellation factors. Connectivity tessellation 33 determines how the domain points are combined or connected to produce tessellated primitives. These functional modules may operate in accordance with a standardized tessellation approach, such as DX11. These domain points are passed to a domain shader 35 which uses this data, along with control points produced by the hull shader according to a programmable geometry shader 37. Shader 37 can perform further programmable shading operations on geometry and produce vertices to be stored in vertex cache 41. Vertices stored in vertex cache 41 can serve as a basis for producing data to be used during rasterization (e.g., tile-based rasterization) and during ray tracing operations.

Regarding preparations to perform tile-based rasterization, as shown in FIG. 1, the vertices from vertex cache 41 are provided to a clip/cull unit 43 that removes geometry that is not within a scope of visibility for a 2-D image being rendered (e.g., it is off screen or back-facing). Remaining geometry is projected to a 2-D coordinate system for the 2-D image by projection unit 45.

The projected geometry is tiled by a tiling unit 47 (a tile is a region of pixels, such as a rectangular region of pixels). Tiling unit 47 outputs information that identifies which geometry is at least partially within the bounds of each tile. This information can take the form of an identifier for a tile and a list of geometry that is at least partially within that tile. In the context of the present disclosure, the geometry being tiled may include tessellated geometry. As explained above, tessellated geometry is geometry that was derived from source geometry. In the context of the present disclosure, the information identifying a tile and a list of geometry can include identifying information for source geometry; this information may be called an "object list" for a particular tile. Object lists may be stored in memory, for example in a buffer. To rasterize and shade each tile for display, an object list for that tile can read.

In complex 3-D rendering, a voluminous amount of data may be generated or required in order to individually identify each primitive. Therefore, in some implementations, an approach to compressing this data may be employed. When the data for a tile is to be used, then a reverse compression or other interpretation can be applied to the data contained in the object list for that tile.

In FIG. 1, a processing element that produces bounding volumes 39 can operate on final geometry within subvolumes of 3-D space using vertices produced as a result of programmable geometry shading 37, which vertices can be stored in vertex cache 41. That geometry extents data can be stored in non-transitory memory 57. During 3-D operations, such as ray traversal or ray intersection testing, a portion of final geometry may be (re)created and stored in non-transitory memory 55. Non-transitory 55 may be implemented in a variety of ways and FIG. 1 does not imply that non-transitory memory 55 is a single physical memory. A geometry unit controller 61 can operate to indicate which portions of geometry are to be processed (e.g., scheduling production or supply of final geometry to consumers thereof, as explained below).

Rasterization 54 can use an output of a screen space geometry buffer 51, which expresses final geometry mapped to screen space. For example, rasterization 54 can operate on tiles of geometry. An output of rasterization 54 includes visible surfaces, which may be submitted to pixel shading 51, which outputs pixel shade results data to an output buffer 72. In general, such pixel shading may be included within a texturing and shading unit 52, which may be implemented on a programmable computation unit or cluster of units. This unit 52 also may implement ray shaders 53. Ray shaders 63 may be triggered based on outputs of ray tracing unit(s) 59. Ray tracing units may identify closest intersections between final geometry and rays. These intersections may be shaded according to programmable shading modules. Ray tracing units 59 may use ray data 65 during ray traversal. Ray shaders 63 also may access such ray data 65, and may store new rays in ray data 65.

Compressed Tile Object Lists

Tiling unit 47 divides an image into a plurality of tiles, each comprising a plurality of image pixels. Tiles are typically rectangular but can be other shapes. For each tile, tiling unit 47 determines whether each of the primitives is located at least partially within that tile. That is, tiling unit 47 determines whether at least part of that primitive is located within a viewable region of the tile. Tiling unit 47 also derives an object list for each tile. The object list indicates primitives located at least partially within that tile. An object list can be created for each tile, even if there are no primitives located within a tile, and in such case, the object list for that tile is empty. In some implementations, not every primitive determined to be located within a tile is actually indicated in the object list for that tile. For example, it may be determined, at the tiling stage, that a primitive is obscured by other primitives in the tile (e.g., a step of hidden surface removal can be employed during tiling), and therefore will not be visible within the tile. That primitive may therefore not be indicated in the object list for that tile, to save processing that primitive unnecessarily later.

The primitives may be indicated in a number of ways. Identifiers identifying each of the primitives can be stored in respective object lists. Each primitive may, for example, be assigned an index, or each of the vertices of the primitives may be assigned an index. These identifiers may reference or provide a pointer to the geometrical data for the respective primitives or primitive vertices. Another example is that, for each tessellated primitive, rather than storing the full geometrical data for the primitive, data is stored from which a final geometry can be derived. For example, a set of control points for the patch and the tessellation parameters, from which the geometrical data for that primitive can subsequently be derived.

As another example, modified primitives (e.g., primitives resulting from tessellation or other geometry shading) can be indicated in object lists. For example, each of the modified primitives can be assigned a unique identifier. For example, each of the modified primitives may be assigned a consecutive integer. If the input primitive is assigned the integer 0, the plurality of new instances of the primitive (or primitives resulting from processing that input primitive) may respectively be assigned the integers 1, 2, 3, 4 . . . n. If it is determined that one or more of the modified primitives is located at least partially within a tile, then the unique identifier for each of those modified primitives is stored in the object list for that tile.

An alternative method for indicating modified primitives may proceed as follows. If it is determined that one or more of the modified primitives is located within a tile, an identifier (the index/indices) for the input primitive, from which those modified primitives are generated, is stored in an object list for that tile. In other words, each of the modified primitives may be assigned the same identifier (index/indices) as the input primitive. For example, if the input primitive is assigned the integer 0, then each of the modified instances of that primitive are also assigned the index 0. The index/indices for the input primitive may be stored once for each of the modified instances of that primitive located within the tile. However, the index/indices for the input primitive may be stored only once per list, regardless of the number of instances of that primitive which are located within a particular tile.

As such, one may not be able to identify, from the object list for a tile, which or how many instances of a primitive identified in the object list are located within that tile. However, this embodiment nonetheless has the advantage that the input primitive, from which the modified instances are derived, is identified in the object list, if at least one of the instances of that primitive is located within the tile, regardless of whether the input primitive itself is located within that tile. Thus, all modified primitives which are located within the tile may be processed to shade the tile accurately using its object list. Furthermore, this approach enables the data stored in the object list to be stored in a highly compressed format.

As described in more detail below, to shade the tile the same modifying function is re-applied to each primitive identified in the object list. Then, once the modified primitives have been re-generated which ones, if any, are located within the tile can be determined using well known techniques as described above.

This approach does have the disadvantage however that, not only must any modified primitives located within the tile be re-generated, but modified primitives which are not, in fact, located within the tile may be computed unnecessarily. Given that each primitive may have hundreds or thousands of modified instances, this situation can result in significant waste of computational resources. Therefore, in one approach, a flag comprising a number of bits, may be stored in the object list for a tile or in another region of memory, indicating which primitives identified in the object list have a modified instance within the tile. This may avoid having to re-apply the modifying function to all of the primitives identified in the object list, while retaining the advantage of being able to store the data in the object lists in a highly compressed format.

As mentioned above, modified primitives may be generated incrementally, such that one modified primitive is created from the input primitive, and then a second modified primitive is created from that modified primitive and so on until a sequence of modified primitives has been derived. As such, in addition to storing an identifier identifying the primitive from which the sequence of modified primitives is derived, data indicating the first and/or last position in the sequence of those modified primitives located within the tile may be stored. This data may be stored in the object list for that tile or in another region of memory. This approach has the advantage that, where only a subset of the sequence of modified primitives is located within a particular tile, not all of the sequence of modified primitives may need to be re-derived in respect of that tile, as will be explained in more detail below.

There is, however, the trade-off that data indicating the first and or last sequence position needs to be stored for each of the primitives identified in the object list. In this described embodiment, where the primitives are tessellated primitives, it will be appreciated by those skilled in the art, that there may be thousands of primitives generated by each patch. Storing this position data for each of the primitives would require a large amount of memory.

A compromise may be to determine the highest and or lowest sequence position of any modified primitives located within the tile which are derived from tessellated primitives derived from a patch of surface data. This approach provides that only two integers need to be stored per tile for the entire patch. This technique may result in more unrequired modified primitives being generated, but requires less memory whilst avoiding re-deriving some unrequired modified primitives.

In some embodiments, there may be more than one step of shading (modifying) applied to any given element of source geometry, in order to derive final geometry. Each of these steps may apply a different modifying function or procedure to an input primitive. Each modifying function may be assigned an identifier that identifies a modifying function (or sequence thereof) to be used to generate modified primitives. That identifier may be stored in an object list pertaining to a tile containing those modifying primitives. Data indicating a first and/or last position in a sequence of the modified primitives may be stored in respect of each of the modifying units. The list of indices may be compressed, for example using an index/vertex buffer in a manner known to those skilled in the art. A number of different techniques for compressing a list of indices of tessellated primitives derived by tessellation of a patch of surface data, which take advantage of knowledge of the internal structure of a tessellated patch of surface data, may be provided. An advantage of assigning the modified primitives the same index/indices as the input primitive is that the same compression techniques may be utilized to compress the index/indices.

Pre-Processing of Geometry for Ray Tracing

Processing required to prepare for ray tracing differs in some respects from processing of geometry for rasterization. One principal difference is that efficiency in ray tracing complex scenes typically is enhanced by creating an acceleration structure that has different levels of abstraction of geometry in the 3-D scene. For example, an acceleration structure may be a hierarchical arrangement of elements, where each of the elements bounds a respective volume in 3-D space. Each volume may bound a primitive, multiple primitives, or a portion thereof. An acceleration structure for ray tracing may be created for final geometry (i.e., after programmatic geometry modification or creation, such as by using displacement geometry or tessellation). In some cases, efficiency of determining intersections in the 3-D scene may be enhanced by providing a more detailed acceleration structure. However, a more detailed acceleration structure would be expected to consume more memory than a more granular acceleration structure.

In order to implement memory conscious rendering approaches, which use one or more of rasterization and ray tracing, techniques may be employed to avoid creating and storing final geometry for an entire 3-D scene. These techniques may involve creation of final geometry or other geometry-related constructs (e.g., a portion of an acceleration structure) in response to a need. After production of per-tile object lists, tiling may proceed by stepping through each tile, and processing the geometry indicated from each object list. Thus, depending on implementation, tiling computation can be relatively regular and predictable.

However, traversing rays in a 3-D scene can be very irregular, especially global illumination rays, such as reflection or refraction rays, since rays will be scattered, originating from disparate locations and traveling in various directions (compared with primary rays traced from a scene "camera"). Also, in some situations, rays may be emitted for traversal during the tiling process, in which visible surfaces of geometry for pixels are determined. After these visible surfaces are determined, then those surfaces can be shaded, or otherwise processed. For example, rays may be cast from the surface to determine shadowing of that surface point by lights. Rays may stochastically emitted for global illumination sampling for example. Herein, the term pixel is often used, but pixels may be composed of a variety of fragments. Also, multiple samples may be taken for each pixel by offsetting the pixel in one or more directions when determining visible surfaces for that pixel.

The pre-processing of geometry for ray tracing can benefit from pre-processing performed for tiling purposes. Pre-processing for tiling also can benefit from geometry processing performed to setup for ray tracing. Example opportunities to make pre-processing of final geometry for tiling and for ray tracing, as well as for on-demand generation of final geometry for tiling and ray tracing are explained.

In one aspect, geometry pre-processing for ray tracing provides for allocating final geometry among elements of an acceleration structure. The allocation of these elements in an acceleration structure can be represented by compressed object list data for each of these elements, according to implementations of object list data, but where a decision criteria of whether to include the data in an object list or not is whether the object is within a 3-D volume associated with a particular element.

Production of Final Geometry

Final geometry produced according to the disclosure may be produced from source geometry which is modified according to one or more modification functions. These modification functions may be applied serially. A concatenation of modification functions may also be expressed or collapsed into a fewer separately identification steps or portions of processes. In the context of implementations of the disclosure, where source geometry that produces final geometry for a particular tile or region of 3-D space is identified in a list, that this also may contain data that identifies what geometry modification processes would be performed on that data to result in final geometry. As such, re-creation of final geometry for particular portions of a 3-D scene (either by virtue of being identified as relevant to a tile of screen space pixels or a volume of 3-D space for ray tracing) may be performed by applying the identified sequence of modifications to the identified source geometry.

The implementation of this geometry processing may be performed differently in different implementations. For example, where a programmable cluster of computation units is available to perform geometry computation, shading computation (e.g., shading of ray intersections, vertex shading, pixel shading, and so on), ray traversal, or other kinds of tasks, that programmable cluster can be configured to implement the geometry processing required. The implementation can run threads of computation that receive inputs and/or produce outputs from another thread in order to implement a sequence of geometry modifications required. In other examples, intermediately processed geometry data may be stored in memory and read/written as required by one or more threads of computation implementing the geometry processing.

As mentioned above, some geometry modifications may be incremental. So, even if it is can be indicated that a certain portion of an incremental series of geometry elements are located within a particular tile, it may not be possible to generate only those instances, because later instances may depend on iterating through earlier primitives in a programmatic sequence. In one implementation, unnecessarily repetition computation is reduced by storing incremental geometry data in a local memory, such as a cache. This has the advantage that, where the instances are spread over more than one tile, predecessor geometry elements may not need to be recreated for each tile. In such an implementation, it can be defined which portions of an incremental series of geometry are within a particular tile or 3-D acceleration structure element, and then those elements can be first looked for within a cache, before beginning a geometry process to reproduce those elements, which may require iterating through predecessor elements that are not within that tile or acceleration structure element.

In an alternative embodiment, geometry modification/production may be halted after the last primitive located within a particular tile has been generated. This may be determined, for example, by reading data indicating the last primitive in the sequence located within that tile. In this embodiment, the state of a modifying unit or process may be stored, as well as the last generated modified primitive, so that the modifying or production can continue execution from where it has stopped for another tile. Thus, where for example the first 100 modified primitives have been generated, and then the $101^{st}$ modified primitive is required by a subsequent tile, the modifying unit does not have to start re-deriving the sequence of modified primitives from the beginning. The first modified primitive located within a particular tile (or 3-D spatial element) may be determined by reading the data indicating the position of the first modified primitive in the sequence located within the tile.

In this approach, before modifications are applied to a primitive identified in an object list, it may be determined whether any modified primitive with a corresponding identifier is stored in the cache. If so, the nearest modified primitive in the sequence to the required modified primitive may be fetched, and where the state of the modifying unit has been stored, the modifying unit can continue execution from that modified primitive until the required modified primitive is generated. In applications where the modified primitives must be generated incrementally, the nearest modified primitive earlier in the sequence may be required which may not necessarily be the nearest.

Once the modified instances have been re-generated, if necessary, which ones of the instances are within a particular tile may be determined using well known techniques, as described above. For each tile, after data for each of the modified primitives and non-modified primitives located within that tile has been obtained, the primitives may be processed to render the image using well known techniques.

For example, the primitives may be passed to hidden surface removal unit 70, which removes any surfaces which are not visible in the tile, and the resulting pixel data may be passed to a texture and shading unit 80 which applies pixel or texture shading before the final pixel values for display are written to memory.

Figure 2A:
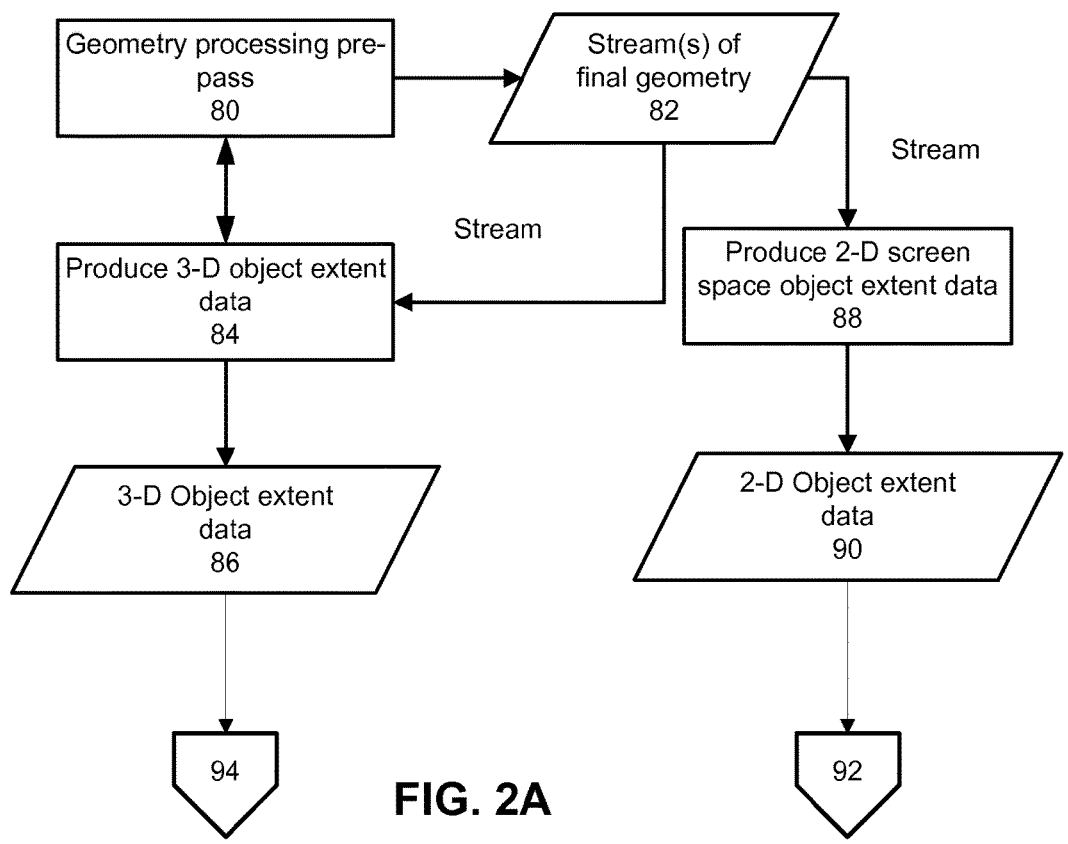
Figure 3:
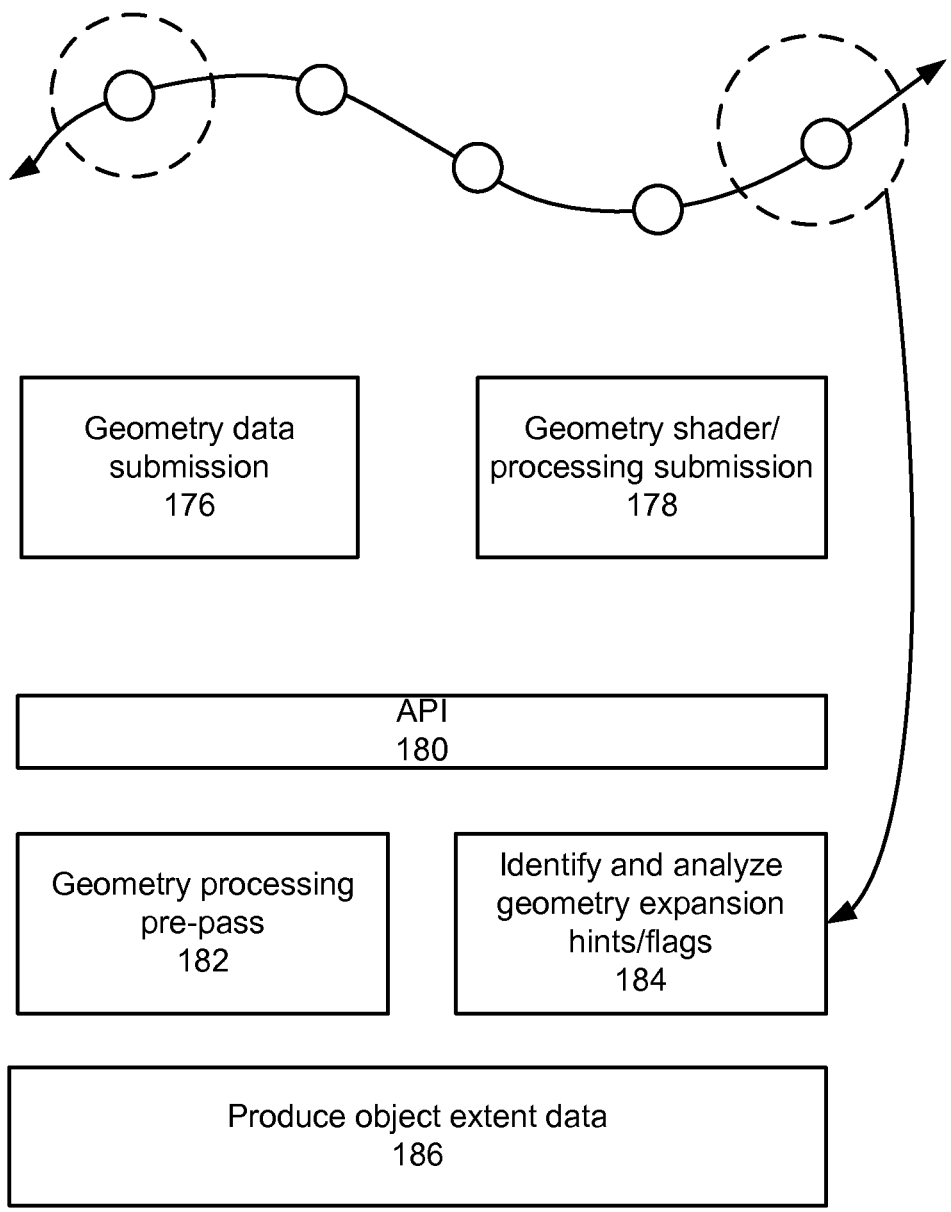
FIG. 3 depicts an example implementation by which source geometry data can be submitted through an API, and the source geometry data can include hints that indicate or which can be used to derive volumetric bounds of final geometry that will result from a particular set or element of source geometry data.

FIG. 2A/B depicts a joint geometry process which can be performed during rendering that uses a hybrid of rasterization (tile-based rasterization) and ray tracing. In FIG. 2A, a geometry processing pre-pass that produces a stream of final geometry 82, and is used to produce (84) 3-D object extent data that is stored (86). 3-D object extent data can map to nodes of an acceleration structure, be expresses identifiers for nodes of an acceleration structure, or be contained within nodes of an acceleration structure. The 3-D object extent data can indicate source geometry and geometry processes to be performed on that source geometry to make final geometry and functions to identify a boundary of the final geometry. The stream of final geometry data is used to produce (88) 2-D screen space object extent data which is stored (90). Turning to FIG. 2B, 3-D object extent data is used for ray tracing 9103), where rays are sorted/traversed (105) through a coarse acceleration structure. Source geometry can be identified (111), where caching is used, presence of final geometry in a cache can be checked (113). Where such final geometry is in a cache, then source geometry may not need to be identified (111). If final geometry is unavailable, then that final geometry is recreated (115) from the source geometry. An acceleration structure within the coarse element of the acceleration structure can be created (117) and used for traversing (119) rays within the volume of that coarse acceleration structure element. Primitive testing (121) also is performed for rays within that coarse acceleration structure element, based on the final geometry.

FIG. 2C depicts a rasterization flow where screen space tiling 123 can be performed by beginning to process a tile (125) including accessing 2-D screen space object extent data (127) (e.g., an object list) and checking whether identified final geometry is cached (133) and to the extent not cached, providing identified source geometry and geometry process identification (129) to a geometry processing unit. On retrieved or recreated final geometry, HSR (visible surface identified) can be performed. In some implementations, even though certain final geometry is not visible within a tile, some of that geometry may be cached, because it may be used for ray traversal operations. In some situations, a cache requested flag may be set for certain final geometry, which would indicate demand on the ray traversal side for certain portions of final geometry (or vice versa).

FIG. 3 depicts an example implementation by which source geometry data can be submitted through an API 180, and the source geometry data can include hints that indicate or which can be used to derive volumetric bounds of final geometry that will result from a particular set or element of source geometry data. A pre-processing step can be performed with or instead of using hints as described above. FIG. 3 thus indicates that although a geometry pre-pass may be performed, other implementations may apply hints or heuristics to obtain approximations for extent of final geometry from source geometry. Object extent data can be used to identify source geometry data that will be used to produce final geometry data needed to complete intersection testing or other operations on geometry that may be needed during ray tracing. Such object extent data can include a definition of a coarse acceleration structure Here, coarse acceleration structure can mean that rather than continuing to subdivide volumes of a given size, to create smaller groupings of primitives for intersection testing, the volumes are not subdivided. Therefore, the leaf nodes of a coarse acceleration structure will be relatively large and will bound a relative high number of primitives of final geometry. In an example, a fine-grained acceleration structure may generally bound 5-10, 10-15, 15-20, or perhaps 20-30 or 30-50 primitives, while a node of a coarse grained acceleration structure may bound one or more hundreds of primitives, or even thousands of primitives. These numbers can be considered in relative terms, instead of absolute numbers or ratios.

Figure 4:
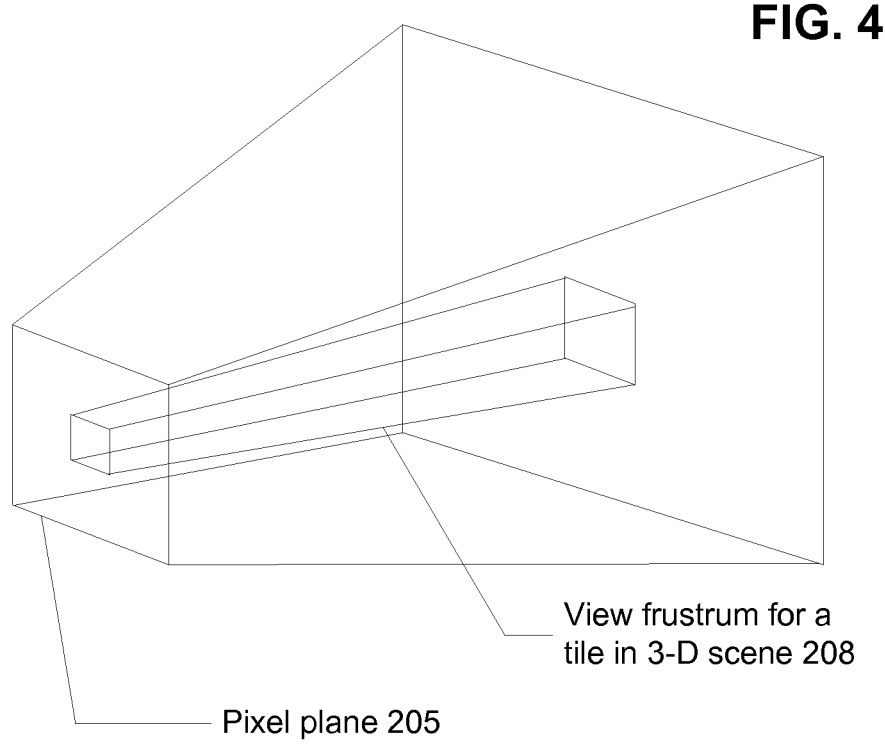
FIG. 4 depicts a view frustrum and a tile located therein.

FIG. 4 depicts a view frustrum for a pixel plane 205, and a view frustrum 208 for a particular tile in pixel plane 205. The view frustrum for pixel plan 205 would be a sub-portion of an entirety of a 3-D scene in which the view frustrum would pass (even if a portion of the view frustrum also is outside of the 3-D scene). View frustrum 208 for a particular tile may overlap certain elements in a coarse acceleration structure in the scene. Overlap between these spatial entities may be used as an input in expressing object extent data for tiling and for 3-D volumes. For example, an object list for the tile may be expressed as a set of acceleration structure elements that enclose view frustrum 208. Each of these acceleration structure elements may have a respective object list, such that the collection of these object lists forms an object list for the tile. Some implementations may categorize elements of final geometry based on whether they are within or within a view frustrum of the 2-D plane, or of a tile, or both.

Figure 5:
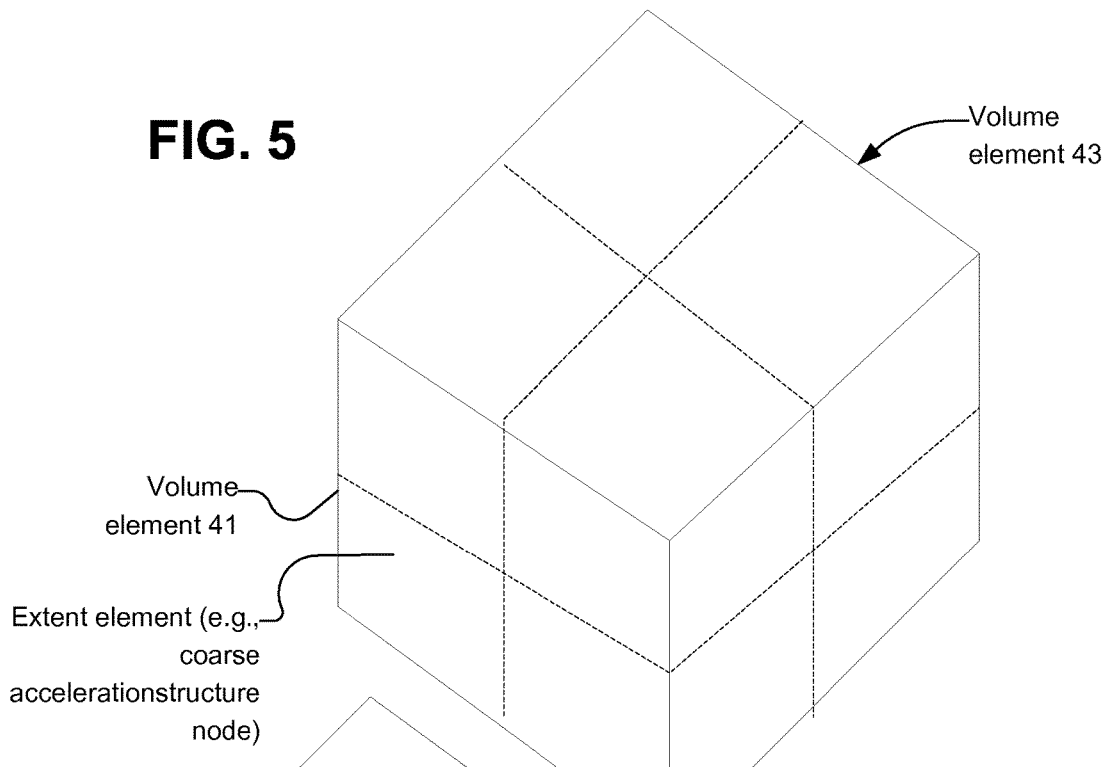
FIGS. 5-6 depicts an example of a Bezier patch surface that has a shell defined by planar patches.
Figure 6:
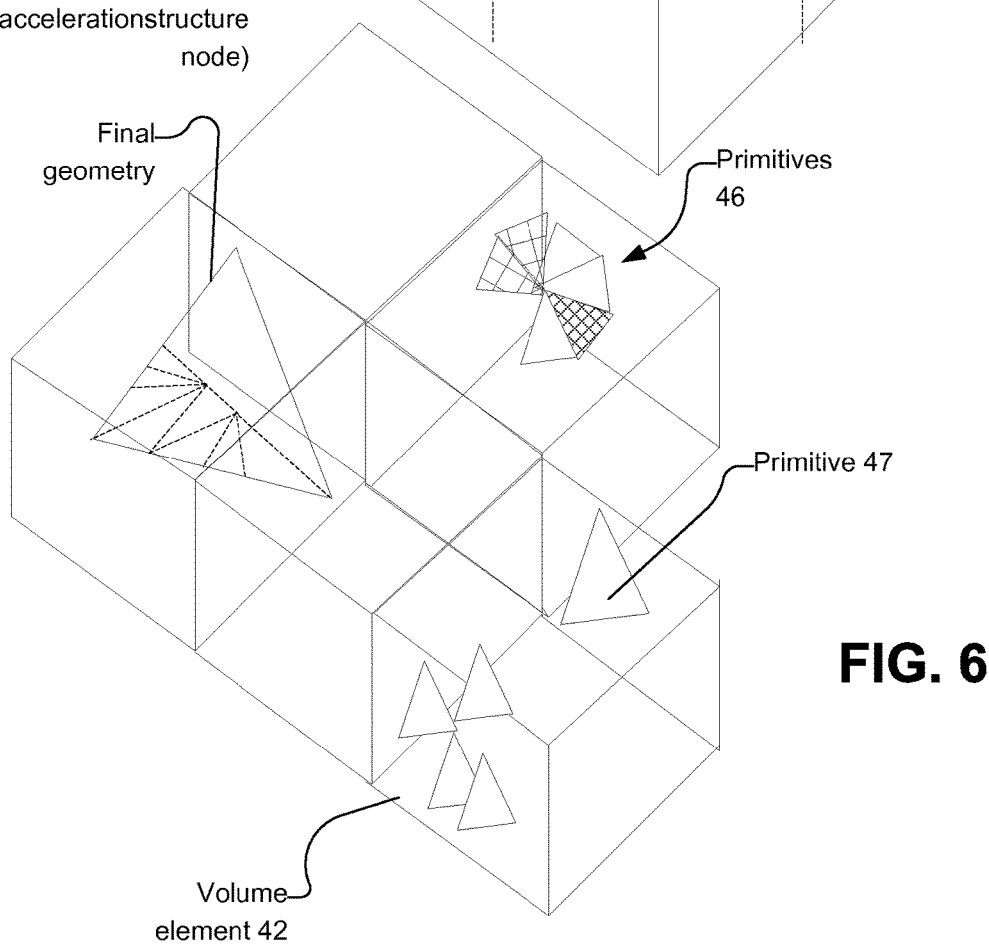

FIGS. 5 and 6 depict various aspects of locating scene objects in 3-D space. With respect to FIG. 4, the view frustrum of FIG. 4 may be located within the cubes depicted of FIG. 5, or partially within. Not all scene definitions are required to be cubes or other regular shapes, but for simplicity, this is depicted in the figures.

Figure 7:
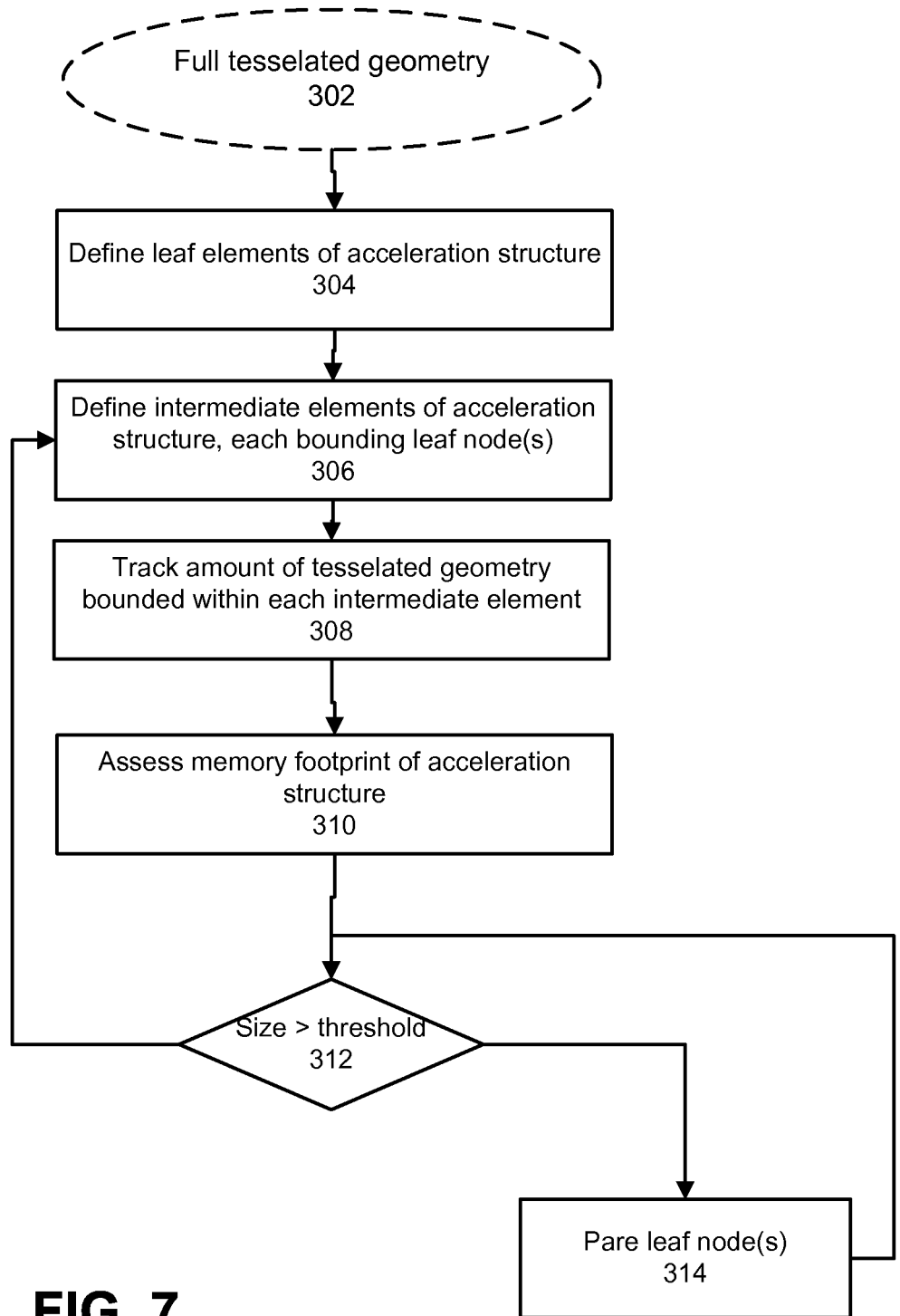
FIG. 7 depicts an example process of defining an acceleration structure based on information relating to tessellated geometry, such as tuning a level of coarseness in an acceleration structure that will be used to subdivide a 3-D scene into different portions, for the purpose of on-demand creation of final geometry of those different portions.

FIG. 7 depicts an approach to tuning a level of coarseness in an acceleration structure that will be used to subdivide a 3-D scene into different portions, for the purpose of on-demand creation of final geometry of those different portions. A coarse acceleration structure may be defined based on a criteria of how much memory can be allocated to storing the coarse acceleration structure. This may be chosen based on an expectation of a number of rays to be traced, where if many rays are to be traced, then a finer acceleration structure may be of comparatively large benefit. As explained above, rays may be collected against elements of the coarse acceleration structure, and then a finer grained acceleration structure may be created before traversal of rays in that coarse acceleration structure element, or simply traversing rays within that structure. Some approaches may provide sorting of the rays within sub-portions of the coarse acceleration structure element, and creating geometry for those sub-portions to test against an appropriate subset of the collected rays.

Figures 8, 9:
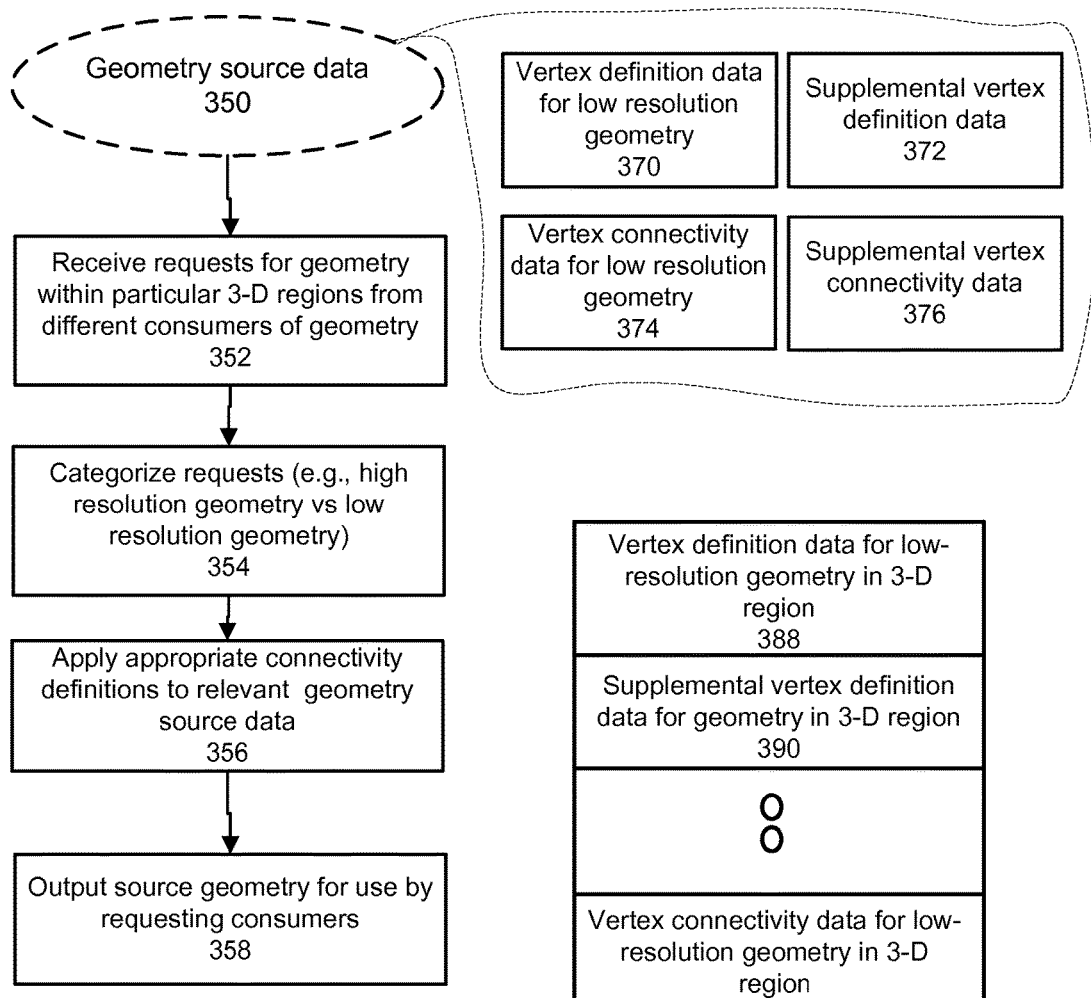
FIG. 8 depicts an example process of multi-resolution on geometry generation.
FIG. 9 depicts storage of source geometry data for multi-resolution geometry generation.

FIG. 8 depicts an example process by which geometry at multiple resolutions can be produced on demand; such process also can involve producing portions of an acceleration structure, although the example is limited to geometry. Such a process may be implemented, for example, where final geometry for a given object at a first resolution is to be provided to a first consumer of that final geometry, while final geometry for that object at a second resolution is to be provided to a second consumer of that final geometry. In a particular example, a ray tracing subsystem can be provided geometry at a lower resolution for the object than geometry that is used for a rasterization subsystem. For example, a total number of primitives used to define the object, when those primitives are used for ray tracing can be different than a total number of primitives used to define that same object when rasterizing that object.

In the example process of FIG. 8, geometry source data 350 is available, from which final geometry can be created. This geometry source data 350 may comprise vertex definition data for low resolution geometry 370, supplementary vertex definition data 372, vertex connectivity data for low resolution geometry 374 and supplementary vertex connectivity data 376.

At 352, requests for final geometry within particular regions of a 3-D space are received from different consumers. For example, a ray tracing subsystem and a rasterization subsystem are different consumers; these subsystems also each can be considered to contain multiple consumers of geometry. Also, particular elements of code being executed can be considered consumers; for example, shader modules could make geometry requests. Regions of 3-D space can be identified in different ways. For example, a rasterization subsystem may identify a tile within an image to be rendered, and that tile can be used to index a mapping of regions of 3-D space within a view frustrum of that tile. A ray tracing subsystem may identify an element of an acceleration structure. Consumers may identify a geometry object or list of objects for which final geometry is to be produced. Thus, it would be understood that implementations may vary in how consumers of geometry can indicate which geometry is being requested (and the same for acceleration structure elements).

At 354, these requests are categorized, such as according to whether each requests high or low resolution geometry. Although this example concerns two available geometry resolutions, more resolutions may be provided, or there may be a programmatically configurable geometry generation that can create final geometry according to a target that is not directly expressed in terms of resolution or primitive count, for example. In one approach, at 356, a selected portion of vertex connectivity data is applied to an appropriate portion of vertex data from geometry source data 350, for each of the consumers, for each of the regions of 3-D space in which geometry was requested. The finalized geometry is outputted at 358.

FIG. 9 depicts an example memory map 382 of how vertex data and vertex connectivity data can be arranged in memory. In FIG. 9, vertex definition data for low-resolution geometry 388 can be stored separately from supplemental vertex definition data 390, and vertex connectivity data for low resolution geometry 392 can be stored separately from vertex connectivity data for high-resolution geometry 394. In order to create geometry at a particular resolution, the base line low resolution geometry may always be accessed, and then selections from supplemental vertex definition data can be accessed, along with appropriate portions of vertex connectivity data.

Other approaches laying out geometry data for storage in memory are possible. For example, vertex data pertaining to specific regions of 3-D space can be stored together; for example, low resolution and supplemental vertex definition data for a particular region of 3-D space can be stored together. This approach provides that low resolution and supplemental vertex definition data would then be interleaved. An object-by-object aggregation of low resolution and supplemental vertex definition data also can be provided. These options can both be used in some approaches.

The example of FIG. 8 relates primarily to generating geometry using selections from sets of primitive data. However, in other implementations, higher resolution geometry can be generated from lower resolution geometry by procedural modification. Such implementations can use higher order surface definition data (rather than primitive data), and that higher order surface definition data can be processed according to one or more geometry processes in order to produce geometry at a desired resolution. Although these examples primarily treat different resolution geometry, implementations of on demand geometry processing also can produce different kinds of final geometry for different consumers. Also, some implementations may produce and/or output a different subset of primitives, even at a given resolution. For example, geometry production that is intended for consumption by a rasterization subsystem may clip geometry to a view frustrum of an image, or of a tile within the image, and/or cull backfacing primitives. However, backface culling of primitives of an object would not be performed for a ray tracing subsystem.

Figure 10:
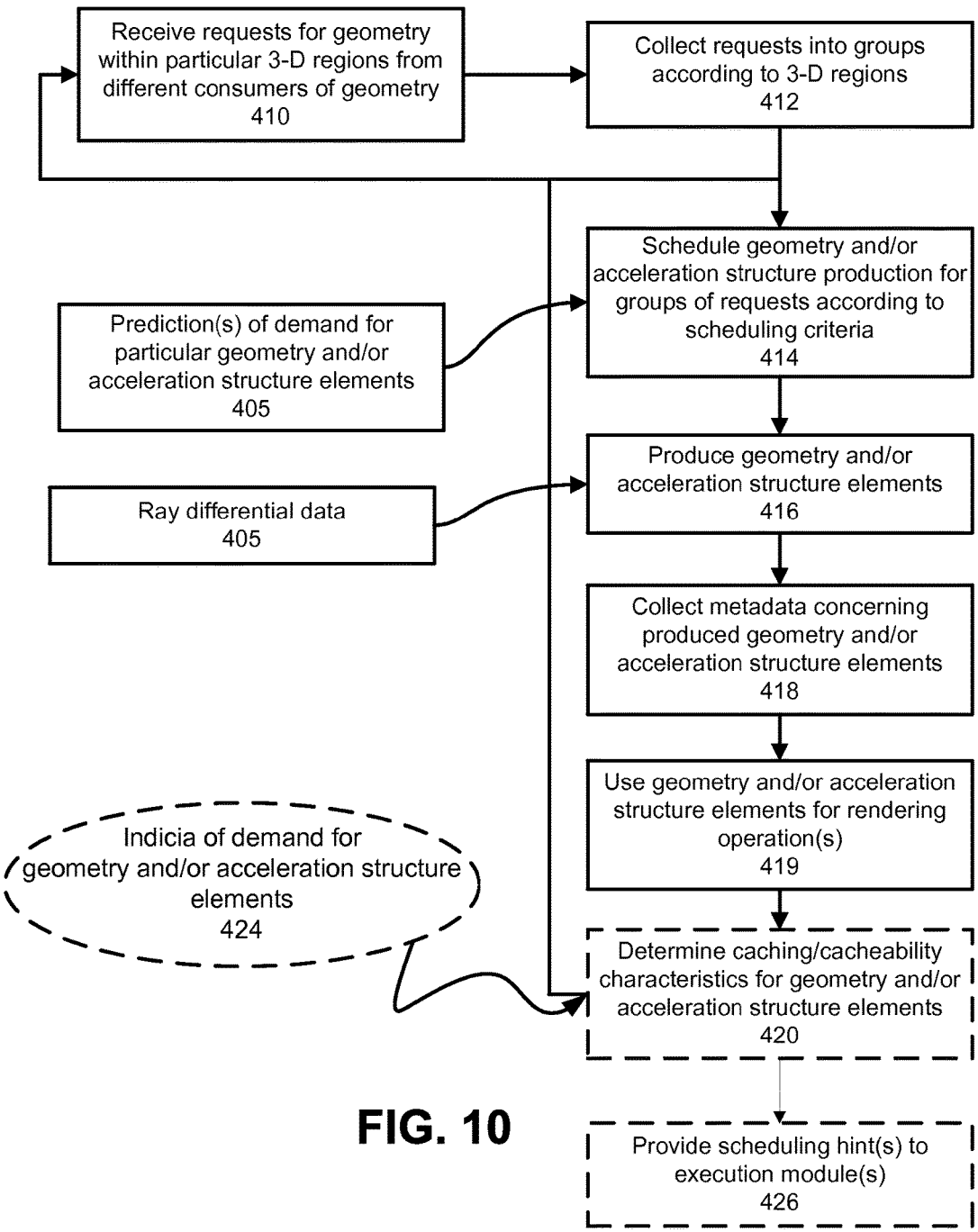
FIG. 10 depicts an example process of scheduling geometry and/or acceleration structure creation tasks.

FIG. 10 depicts an example process of controlling scheduling and/or caching of acceleration structure elements and geometry data. In a situation where resources are unconstrained, scheduling of geometry production may simply provide in order processing of requests as received. However, such an approach leaves optimization available, as explained below. At 410, requests for geometry within a particular 3-D region (which can come from different consumers) are received. At 412, these requests are collected into groups according to 3-D region. At 414, geometry and/or acceleration structure element production for these groups is scheduled according to scheduling criteria. Thus, in a first implementation, requests are not processed in order, but are deferred within a scheduling window in order to identify requests that pertain to the same region of 3-D space (or to the same object, for example). Such scheduling 414 also can use inputs descriptive of prediction(s) of demand for particular geometry or acceleration structure elements.

Scheduling can involve determining how much computation resource can be used for geometry production, and a number of groups concurrently processed can be selected accordingly. Priority can be given to 3-D regions of space having more requests. A request from a rasterization subsystem can be weighted more highly than a request from a ray tracing subsystem. Some systems may have multiple frames in flight, and requests pertaining to earlier frames can be prioritized over requests from later frames. Scheduling also can involve comparing an expected amount of geometry and/or acceleration structure elements that would be produced to complete a given request, and determining whether sufficient memory is available. Still further scheduling criteria can include determining whether source geometry is available in a cache for some portion requests, and prioritizing those requests. Conversely, requests can be culled if final geometry or acceleration structure elements are present in a cache (or otherwise directly serviced from the cache); for example, a request can simply be a request for final geometry—not necessarily a request to produce such geometry. A geometry production process can return the geometry requested (or provide a references or set of references to memory storing such geometry).

Aside from servicing requests from existing geometry data, at 416, requested geometry and/or acceleration structure elements are produced. During such production, at 418, metadata concerning such production can be collected. Such metadata can include a size of the data produced, a memory access pattern for source geometry, an amount of computation required to produce the geometry, and so on. This metadata can be used in scheduling at 414, as well as determining caching of such data (described below). At 419, consumers of produced data can use such data as needed. Such usage may occur over a period of time and may occur concurrently with generation of other data. Action 419 is included primarily to address applicability of actions 420-426 that follow.

At 420, caching/cacheability characteristics for geometry and/or acceleration data produced are determined. Such determination can use indicia 424 of demand for such geometry and/or acceleration structure elements. Such determination also can use metadata collected at 418. For example, geometry that required a great deal of computation to be performed may be ranked more highly for caching than other geometry. These caching/cacheability characteristics may be effected by directing a cache coherency manager or cache replacement manager to expect a particular number of reads for a given set of data, and then to allow the data to be evicted.

At 426, scheduling hints directed to execution modules can be generated. For example, geometry processing may occur asynchronously from consumption of the geometry. Although it may be expected that a given consumer may be alerted to the availability of geometry that is responsive to a given request, as a basic hint, hints also may alert the consumer that such geometry has been given a certain caching priority. For example, if certain data has been given a low caching priority, then it is more likely that the data may be overwritten or evicted (spilled) to another layer of the cache hierarchy or to main memory. As such, the consumer may elect to prioritize usage of that data. Some implementations may use the combination of caching and scheduling hints to effect a relative order of consumption of the geometry data. For example, some produced geometry data may be initially cached and some stored in main memory, and scheduling hints can identify which data is where. Consumers having data stored in the cache would be expected to use that data within a scheduling window, as it will become more likely to be overwritten as time progresses, or may even be explicitly overwritten by other geometry data, or spilled to main memory.

Figure 11:
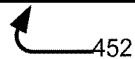
FIG. 11 depicts an example of data that can be used in scheduling geometry and/or acceleration structure creation tasks.

FIG. 11 depicts an example of data 453 that can be stored for acceleration structure elements, which may be used in scheduling production of geometry or usage of produced geometry within such elements. For example, a number of ray groups that need to traverse that element. Hints concerning what a fine grained acceleration structure located within that coarse element can be provided. Such hints can include how many elements are within the coarse element. Hints concerning primitive characteristics can be provided (e.g., a number of primitives.) Complexity hints can be provided; such hints relate to an amount of resource consumption is required to produce acceleration structure elements and/or final geometry within that coarse grained element.

Figure 12:
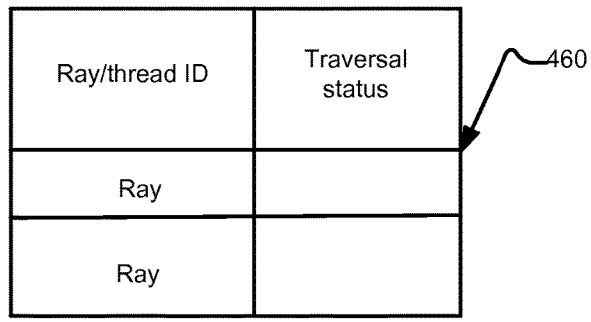
FIG. 12 depicts an example of data representing ray traversal status.

FIG. 12 depicts an example 460 of tracking rays according to traversal status. For example, rays can be concurrently traversed in multiple different parts of an acceleration structure. Different computation architectures can implement ray traversal differently. For example, some implementations may create a thread for each ray and that thread is responsible for fully traversing the ray. Then, example 460 can track which acceleration structure element would be next visited by each ray. Other implementations can maintain a set of threads (or other functional elements) that are for traversing varying rays and/or for testing different sets of rays for intersection with different sets of primitives, for example.

Figure 13:
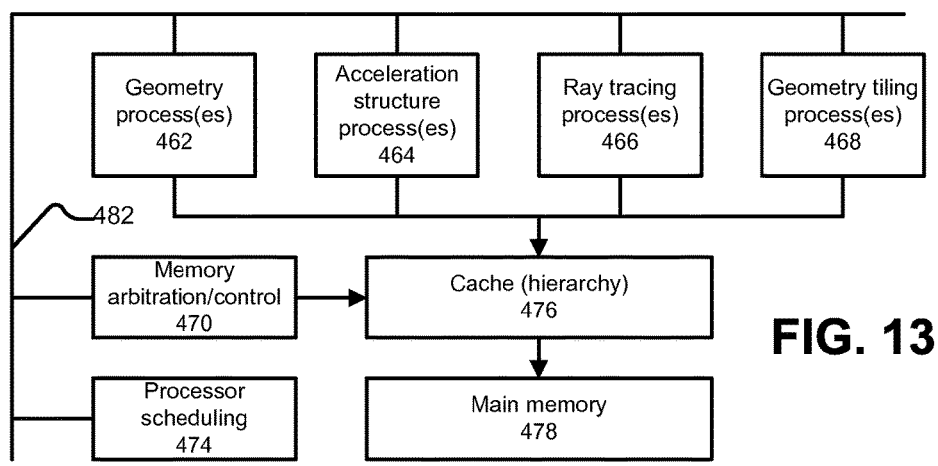
FIG. 13 depicts an example modular structure of function elements.

FIG. 13 depicts an example of modules that can be involved in such on-demand acceleration structure/geometry creation and consumption. For example, geometry processes 462, and acceleration structure processes 464 are responsible for creating final geometry and acceleration structures respectively. Ray tracing processes 466 and geometry tiling processes 468 are example consumers of such geometry. These processes can communicate with memory arbitration/control 470, which is responsible for managing cache hierarchy 476 (and for example, main memory 478); this element can use the caching hints described above. Processor scheduling 474 is responsible for coarse-grained scheduling or allocation of different tasks to different computation resources. Processor scheduling 474 can intake and use the processor scheduling hints described above. Elements 470 and 474 can coordinate, in order to implement staged transfer and consumption of produced data.

Figure 14:
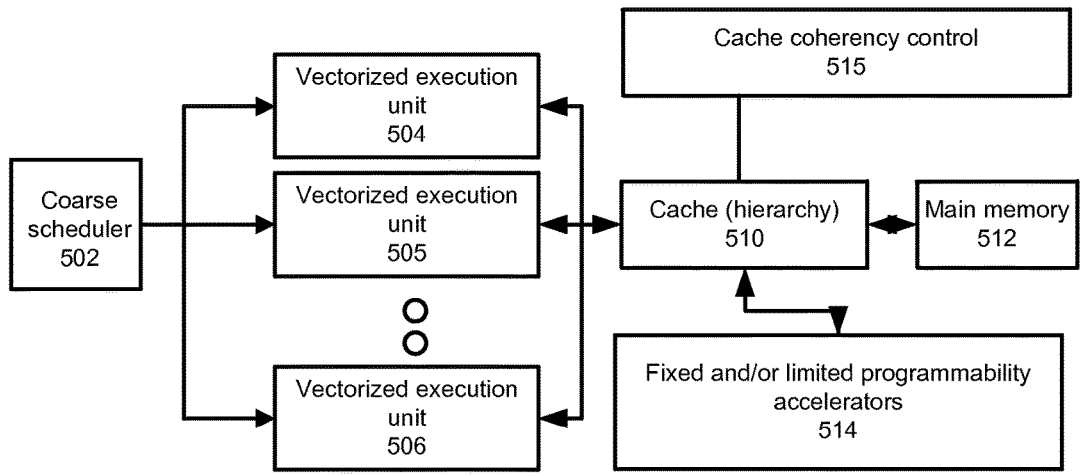
FIG. 14 depicts an example block diagram of system elements that can be used to implement the functional elements of FIG. 13.

FIG. 14 depicts aspects of an example execution unit that can implement the elements depicted in FIG. 13. A coarse scheduler 502 allocates tasks across a set of vectorized execution units 504, each of which can include one instruction fetch/decode unit and a set of processing elements driven by that fetch/decode unit. Coarse scheduler 502 can execute on a vectorized execution unit or on a management processor (not depicted). These vectorized execution units 504-506 communicate with a cache hierarchy 510. Cache hierarchy 510 may provide a set of private memories (e.g., an L1 cache) for each execution unit, as well as other levels of cache hierarchy. Cache hierarchy 510 may communicate with a main memory 512. A cache coherency controller 515 may consume caching hints and control which data is evicted from cache hierarchy 510 and which data is prefetched. Fixed and/or limited programmability accelerators 514 may be implemented for some kinds of processing. For example, a fixed-function ray/primitive intersection test element may be provided.

Figure 15:
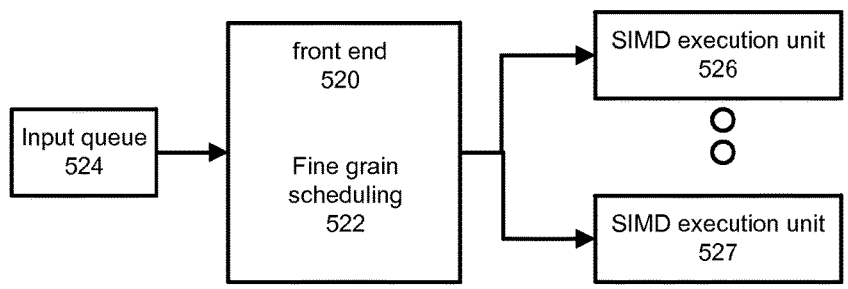
FIG. 15 depicts an example of a vectorized execution unit that can be part of the system elements of FIG. 14.

FIG. 15 depicts an example of a vectorized execution unit. Such example includes an input queue 524 for receiving definitions of tasks, a front end, which can maintain data that tracks various threads in flight on the unit, and can decode instructions. A fine grained scheduler 522 can determine on a clock cycle by clock cycle basis which thread will be permitted to execute instruction(s) on a set of SIMD execution units 526-527. Each of these units can access a register file (not separately depicted). Such register file can be implemented as an L1 cache, or partially as a cache and partially as a register file (e.g., some portion of it can be managed by cache coherency control 515 and some portion not).

These disclosures can factor into a throughput oriented general purpose computation system, where on demand geometry processing can be scheduled along with other computation with a scheduling process that groups workloads according to scheduling keys. These scheduling keys can represent a variety of specific task-based information. For example, a scheduling key can refer to an element of a coarse-grained acceleration structure, and when referenced by a geometry creation process, can be scheduled as a request for on demand geometry creation. Other example task-oriented processes can include more granular tasks, such as testing a ray for intersection with a primitive, or testing a ray for intersection with an acceleration structure element. These scheduling aspects can be applied to other computation where there is a producer of a data element that is consumed by another computation unit or processing element, such as video decoders and pattern recognition kernels, compressors, and so on. Processes can be treated by a scheduling process according to whether they are jitter or latency tolerant. For example, some processes, such as a microphone input processor is not jitter tolerant, and therefore, a scheduling process would not schedule microphone input processing as a peer of ray traversal tasks.

In the context of graphics processing, a frame shader can produce rays to be traversed by a consumer ray traversal unit. A shader can produce data to be consumed by another shader. For example, a shader may want another shader(s) to execute for a reason like handling the exit from a material that is applying distance-dependent attenuation (e.g. murky water) where the other material (shader) might be specified or affected by a value attached to the ray. As such, an intersection may trigger two different shaders to execute, which can execute serially or in parallel (serially where one shader may provide inputs to the next shader). Closures, where a shader outputs an intermediate result that is an input to a closure also is a model that can be scheduled according to these disclosures.

More specifically relating to geometry processing, a vertex shader or geometry shader (outputting polygons/geometric primitives) may have its output sent towards or enqueued to a hierarchy building process. Contribution values may be produced by various producers, and can pass through a queue to a kernel that does the read-modify-write of the pixel values in a cache friendly way.

Producers can enqueue outputs in a queue to be read by one or more consumers; collections can be formed based on enqueued outputs. For example, in ray tracing, a ray can be amended to one or more collections for the respective child elements, which will be read by one or more test units. In some cases, an order establishment module may set an order for a plurality of peer collections (e.g., a set of elements that all are to be tested with respect to one or more rays). For example, an element can be prioritized for testing over other elements if it has a lower average distance to different rays to be tested with respect to all those elements. A random or representative ray can be selected for distance testing.

Rays can be emitted from surfaces that were determined to be visible by a rasterization process. However, rays also can be tested for intersection against low resolution (e.g., low polygon count) models of objects located in a given 3-D scene, while rasterization can use higher resolution models of the same objects. Thus, it should be understood that tracing rays from a visible surface identified by a rasterization process does not preclude determining an origin and/or direction for a given ray based on geometry data defined for use in the ray tracing context. For example, a location of a surface where a ray would be emitted for the low versus the high polygon counts may differ; however, the scope of the claims include defining rays based on either model involved, or based on an absolute position in 3-D space, for example.

The order of activities depicted in the diagrams is not by way of limitation that such activities must be, or are preferred to be performed in that order. Additionally, there may be situations where not all depicted activities are performed for a given synchronization operation. For example, some data or table organization or formatting may already have been performed, and so, such activities would not need to be performed again.

As would be apparent from the disclosure, some of the components and functionality disclosed may be implemented in hardware, software, firmware, or any combination thereof. If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

The invention claimed is:

1. A machine-implemented method for use in 3-D rendering, comprising:

accessing, by a processor, geometry data describing geometry located in a 3-D scene, from which a rendering is to be produced, the geometry data describing:
geometry control points that define one or more surfaces of the geometry located in the 3-D scene, and procedural modifications that can be performed on the geometry control points to produce final geometry on which the rendering will be based; and
producing, by a processor, using the final geometry, geometry extents data that establishes an association between a volume defined in the 3-D scene and geometry control points that would, after procedural modification, produce final geometry within the defined volume on which rendering will be based;
storing the geometry extents data; and
rendering a scene in said defined volume using final geometry produced by said stored geometry extents data.

2. The machine-implemented method for use in 3-D rendering of claim 1, further comprising defining rays to be traced in the 3-D scene, by identifying a volume in the 3-D space in which a subset of the rays is to be tested for intersection, using the geometry extents data to identify geometry control points that produce final geometry in the identified volume in the 3-D space, then executing any procedural modifications for those identified geometry control points to produce final geometry in the identified volume, and then testing final geometry for intersection with the subset of the rays.

3. The machine-implemented method for use in 3-D rendering of claim 1, further comprising defining the volumes in 3-D space as comprising frustra for each screen space tile of a plurality of tiles, each comprising a plurality of pixels and that collectively define a 2-D image to be rendered.

4. The machine-implemented method for use in 3-D rendering of claim 1, further comprising producing an acceleration structure comprising elements bounding respective portions of the 3-D scene, and using the acceleration structure to identify respective subsets of the final geometry to be tested for intersection with different rays.

5. The machine-implemented method for use in 3-D rendering of claim 1, further comprising using hint data to define the volumes in the 3-D scene that are referenced in the geometry extent data.

6. The machine-implemented method for use in 3-D rendering of claim 1, further comprising associating procedural modifications with geometry extents data that are required to produce final geometry within a volume of the 3-D scene to which the geometry extents data pertains.

7. The machine-implemented method for use in 3-D rendering of claim 6, further comprising making a rendering using both a rasterization subsystem and a ray tracing subsystem that each make requests for portions of final geometry, and responsive to the requests, producing the final geometry by performing the procedural modifications associated with the geometry extents data associated with volumes of the 3-D scene bounding the requested portions of final geometry.

8. The machine-implemented method for use in 3-D rendering of claim 7, wherein the method further comprises producing final geometry having a level of detail dependent on whether to the request originated from the ray tracing subsystem or the rasterization subsystem.

9. The machine-implemented method for use in 3-D rendering of claim 7, wherein the method further comprises producing both a finalized acceleration structure within a portion of the 3-D scene and final geometry within that portion of the 3-D, responsive to a request from the ray tracing subsystem.

10. The machine-implemented method for use in 3-D rendering of claim 1, further comprising producing a coarse acceleration structure with leaf elements and using leaf elements of the coarse acceleration structure as the geometry extents data.

11. The machine-implemented method for use in 3-D rendering of claim 10, further comprising collecting rays to be traced against elements of the coarse acceleration structure and traversing rays collected against a particular element of the coarse acceleration structure by dynamically producing a finalized acceleration structure within that particular element of the coarse acceleration structure prior to scheduling traversal operations for the collected rays.

12. The machine-implemented method for use in 3-D rendering of claim 11, further comprising producing final geometry within portions of the finalized acceleration structure responsive to a scheduler indication.

13. The machine-implemented method for use in 3-D rendering of claim 1, wherein the accessing and producing are performed in a pre-pass over source geometry data, the source geometry data comprising vertex data and two or more sets of vertex connectivity data.

14. The machine-implemented method for use in 3-D rendering of claim 1, wherein the procedural modifications that can be performed on the geometry control points comprise procedural modifications to be used for producing finalized geometry for ray tracing and procedural modifications to be used for producing finalized geometry for rasterization.

15. The machine-implemented method for use in 3-D rendering of claim 1, wherein the producing of the geometry extents data comprises producing a hint indicating an amount of geometry expansion to be expected when producing final geometry for the volume defined in the 3-D scene that is associated with that portion of geometry extents data.

16. The machine-implemented method for use in 3-D rendering of claim 1, wherein accessing comprises accessing a hint that is associated with a control point, which indicates a bound on an amount of geometry that may result when performing procedural modification using that control point, to produce final geometry.

17. The machine-implemented method for use in 3-D rendering as claimed in claim 1, further comprising:
identifying a volume in the 3-D scene;
creating on demand final geometry in the identified volume by:
selecting geometry control points using stored geometry extents data associated with the identified volume; and
performing procedural modification on the selected geometry control points to produce the final geometry.

18. A graphics rendering system comprising:
a geometry processing element configured to:
access geometry data describing geometry located in a 3-D scene, from which a rendering is to be produced, the geometry data describing geometry control points that define one or more surfaces of the geometry located in the 3-D scene and procedural modifications that can be performed on the geometry control points to produce final geometry on which the rendering will be based, and
produce, using the final geometry, geometry extents data that establishes an association between a volume defined in the 3-D scene and a selection of the geometry control points that, after procedural modification, produce final geometry that respectively is within that volume, and store the geometry extents data; and a rendering subsystem configured to generate requests for finalized geometry within portions of the 3-D scene, the requests to be serviced by the geometry processing element, and to use finalized geometry returned in response to the requests to produce a rendering from the 3-D scene.

19. The graphics rendering system of claim 18, wherein the rendering subsystem comprises a ray tracing subsystem for tracing rays in the 3-D scene, the ray tracing subsystem configured to identify a volume in the 3-D scene in which a subset of rays is to be tested for intersection, and a rasterization subsystem.

20. The graphics rendering system of claim 18, wherein the finalized geometry is produced by the geometry processing element for each respective portion of the 3-D scene by:

selecting geometry control points using stored geometry extents data associated with an identified volume of the respective portion of the 3-D scene; and performing procedural modification on the selected geometry control points to produce the final geometry in the respective portion of the 3-D scene for rendering.

* * * * *